G. D. FERRIS.
CLOTH-CUTTER.
No. 184,769. Patented Nov. 28, 1876.
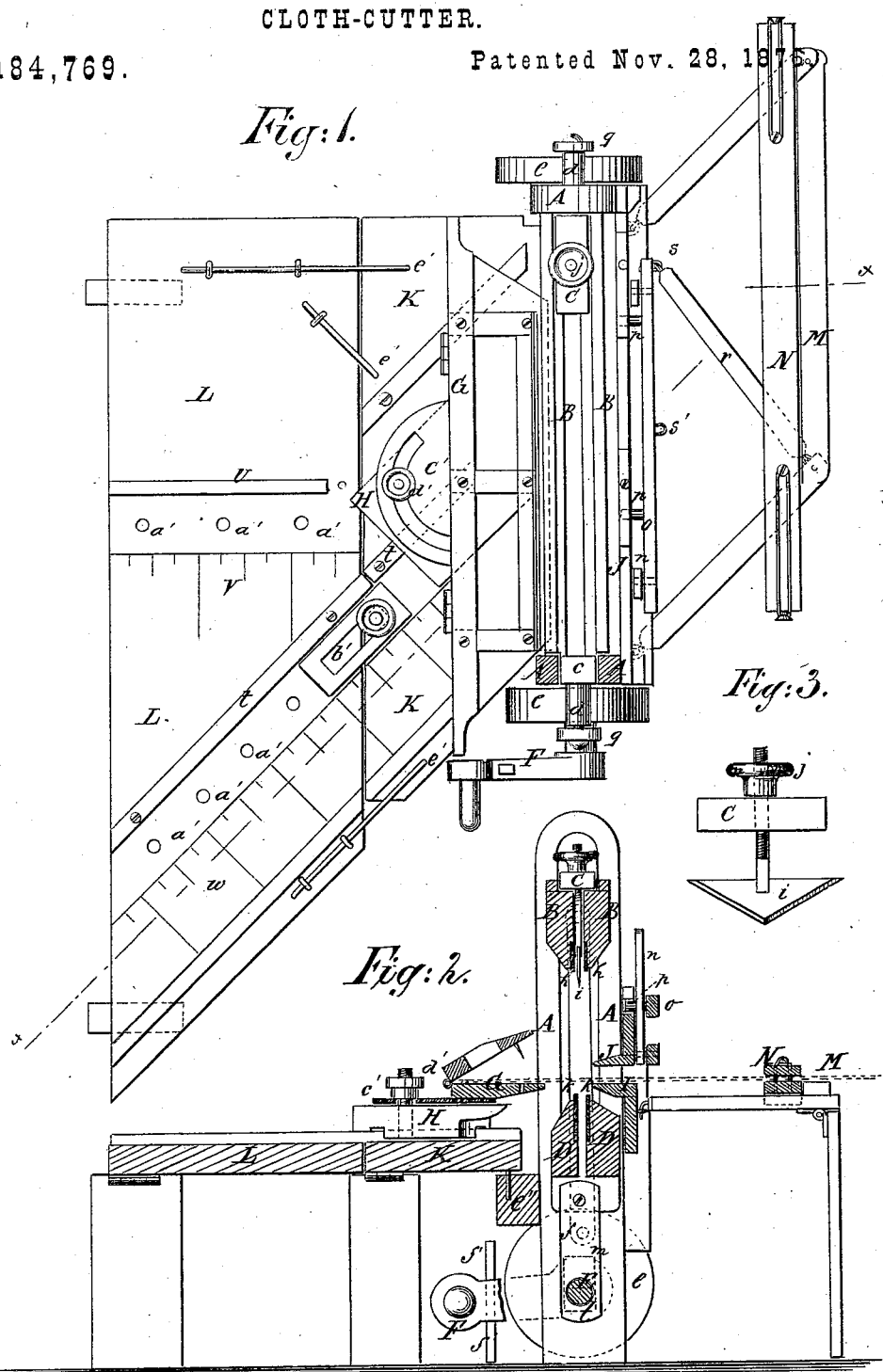
WITNESSES:
INVENTOR:
G. D. Ferris
BY
ATTORNEYS.

UNITED STATES PATENT OFFICE.

GEORGE D. FERRIS, OF SPRINGFIELD, ILLINOIS.

IMPROVEMENT IN CLOTH-CUTTERS.

Specification forming part of Letters Patent No. 184,769, dated November 28, 1876; application filed July 22, 1876.

*To all whom it may concern:*

Be it known that I, GEORGE D. FERRIS, of Springfield, in the county of Sangamon and State of Illinois, have invented a new and Improved Cloth-Cutter, of which the following is a specification:

Figure 1 is a plan. Fig. 2 is a vertical section on line $x\, x$, in Fig. 1. Fig. 3 is a detail view of the knife.

Similar letters of reference indicate corresponding parts.

My invention consists of a combination of a cutter and a measuring and clamping device, as hereinafter more fully described, the object being to accurately cut cloth either straight across the piece or on a bias.

A A are guides attached to the base of the machine. The parallel bars B B are attached to heads $c$, that slide in the guides A. A stud, $d$, projects from the head $c$. E is a shaft, which is provided with journal-boxes in the lower ends of the guides A A, and with crank-disks $e$, having the crank-pins $f$. Connecting-rods $g$ connect the crank-pins $f$ and the studs $d$. The bars B B are provided with strips of metal $h$ at their inner lower edges. $i$ is a double-edged knife placed on a shank that screws through the block C, and is tightened by the lock-nut $j$. The knife $i$ is capable of sliding between the metallic strips $h$, being guided by the block C, which is moved in a groove formed by a rabbet in each of the bars B. D D are bars that are provided with heads that slide in the ways A A, and have the metallic strips $k$, which are capable of shutting between the strips $h$. Eccentrics $l$ are formed on the shaft E, which are connected with the bars D by the rods $m$. A lever, F, is attached to the shaft E, and is provided with the stop-pins $f'$. J is a pressure-bar, that is capable of being brought down on the bar I by the lever $n$, which moves a swinging bar, $o$, carrying two pins, $p$, that engage with slots in the bar J. N is a clamp, held together by springs, and supported on the jointed frame M. This frame is held in the required position by the brace $r$, which is capable of hooking into either of the staples $s\, s'$. K and L are sections of a table, provided with the guides $t$ and U, also the scales V and $w$. Holes $a'$ are also made through the table to receive the bolt for holding the stop-gage $b'$. G is a toothed clamp attached to a slotted quadrant, $c'$, that is pivoted to a slide, H, and is retained at the proper angle by the thumb-screw $d$. The slide H is grooved to fit either of the guides $t\, u$. The legs of the table L K are attached with hinges, so that they may be folded when the table is put away. The table is attached to the main frame of the apparatus by the hooks $e'$. The sections of the table are attached together in the same way.

The operation of the apparatus may be described as follows: If the cloth is to be cut on a bias, the machine is arranged as shown in the drawing, the frame M being adjusted to a line parallel to the diagonal guide $t$, and the slide H being placed on the said guide with the jaws B B. The stop-gage $b'$ is adjusted to the width to be cut. The cloth is put through the clamps N, and under the pressure-bar J, and is secured in the jaws G. The lever F is now turned through a half-revolution, bringing the bars B B and D D together upon the cloth, with the metallic strips $k$ between the strips $h$. The knife $i$ is now moved across the cloth, cutting it truly, without stretching the edge. The bars B B and D D are now separated by turning back the lever F. The cloth in the clamp G is removed, and the clamp is pushed as far ahead as possible, closed on the cloth, and drawn back until stopped by the gage $b'$. The pressure-bar J is closed down upon the cloth, the bars B B and D D brought together, as before, and the operation repeated.

When it is desired to cut straight across the piece of cloth, the part K of the table is removed, and the part L attached to the machine. The slide H is put on the guide U, and the jaws G adjusted at right angles to it. The brace $r$ is hooked into the staple $s'$, making the corners of the frame M right-angled. The cloth is proceeded with as before. The bars B B and D D not only hold the cloth firmly while it is being cut, but it also creases or turns the edge ready for hemming. The knife $i$ is made adjustable, so that as one portion of the edge becomes dull another portion may be used by loosening the lock-nut $j$, and unscrewing it more or less from the block C.

Having thus described my invention, I claim as new and desire to secure by Letters Patent—

1. In a cloth-cutter, a double-edged sliding cutter, $i$, guided by and passing with its screw-shank through the block C, that moves in the grooves of bars B, in combination with two pairs of clamping-bars for holding the cloth, substantially as and for the purpose specified.

2. The combination of the guides A A, bars B B and D D, shaft E, eccentrics $l$, connecting-rods $m$ and $g$, crank-disks $e$, and crank-pins $f$, substantially as specified.

3. The combination of the clamps N, jointed frame M, brace-rod $r$, staples $s\ s'$, and bar I, substantially as specified.

4. The combination of the pressure-bar J, lever $n$, swinging bar $o$, pins $p$, and bar I, substantially as specified.

5. The combination of the toothed jaws G, quadrant $c'$, slide H, and adjusting-screw $d'$.

6. The combination with cutting mechanism, substantially as described, of the tables K L, having scales V $w$, guides $t$ U, stop-gages $b'$, slide H, and jaws G, as specified.

GEORGE D. FERRIS.

Witnesses:
JACOB BREHM,
F. O. PEASE.